United States Patent [19]
Satou
[11] 3,915,409
[45] Oct. 28, 1975

[54] MAGNETIC TAPE CASSETTE

[75] Inventor: Takateru Satou, Tokyo, Japan
[73] Assignee: TDK Electronic Company, Tokyo, Japan

[22] Filed: May 20, 1974
[21] Appl. No.: 471,549

[30] Foreign Application Priority Data
Aug. 15, 1973 Japan ................................ 48-96437

[52] U.S. Cl. ................................................ 242/199
[51] Int. Cl.[2] ........................ G03B 1/04; G11B 15/32; G11R 23/04
[58] Field of Search .......... 242/199, 200, 197, 71.2, 242/76, 75.43, 75.45, 210; 352/72, 78 R

[56] References Cited
UNITED STATES PATENTS

| | | | |
|---|---|---|---|
| 3,065,922 | 11/1962 | Ballauf | 242/199 |
| 3,190,574 | 6/1965 | Purzycki | 242/75.45 |
| 3,833,185 | 9/1974 | Talavera | 242/199 |

*Primary Examiner*—Leonard D. Christian
*Attorney, Agent, or Firm*—Oblon, Fisher, Spivak, McClelland & Maier

[57] ABSTRACT

A cassette tape wind-up control for preventing run-off of the tape when switching from a fast winding mode to a "play" mode which comprises a pressure arm for pressing an external surface of tape being wound with a free end of the arm, a tension arm for contacting a surface of the tape with a free end of the arm and a spring connecting the other end of the pressure arm with the other end of the tension arm.

8 Claims, 5 Drawing Figures

MAGNETIC TAPE CASSETTE

BACKGROUND OF THE INVENTION

1. Field of the Invention

This invention relates generally to cassette tapes, and more particularly it relates to an improved cassette tape especially designed for use in such cassette player operation where the player is placed into a "play" mode immediately from a fast or quick winding mode without first stopping the tape drive with an intermediate placing of the player in a "stop" mode.

2. Description of the Prior Art

Recently, the mechanisms of cassette type tape players have been improved so that there are many cassette type tape players now available which can perform in a "play" mode after being disposed in a "fast" or quick wind mode without utilizing a "stop" mode. However, when a cassette tape is operated by using a cassette player of this type, the rotary velocity at the time of changing from the quick winding motion to the "play" motion drops very suddenly, so that the tape cannot be completely wound-up on the winding reel because of its inertial moment, whereby accidental running off the tape is likely to occur. Moreover, such accidents more easily take place as the diameter of the wound tape becomes greater.

SUMMARY OF THE INVENTION

Accordingly, it is an object of the present invention to provide a novel cassette tape which alleviates the disadvantages of over feed to run off the tape at the time of a changing from a fast or quick winding motion to the "play" motion of a player.

The foregoing object and others are achieved according to the present invention through the provision of a cassette tape which features tape wind-up control means comprising a pressure arm for pressing with one free end thereof an external surface of a tape being wound, a tension arm for contacting with one free and thereof a surface of the tape being wound, and a spring connecting the other ends of the pressure arm and the tension arm.

BRIEF DESCRIPTION OF THE DRAWINGS

Various other objects, features and attendant advantages of this invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENTS

Figure 1:
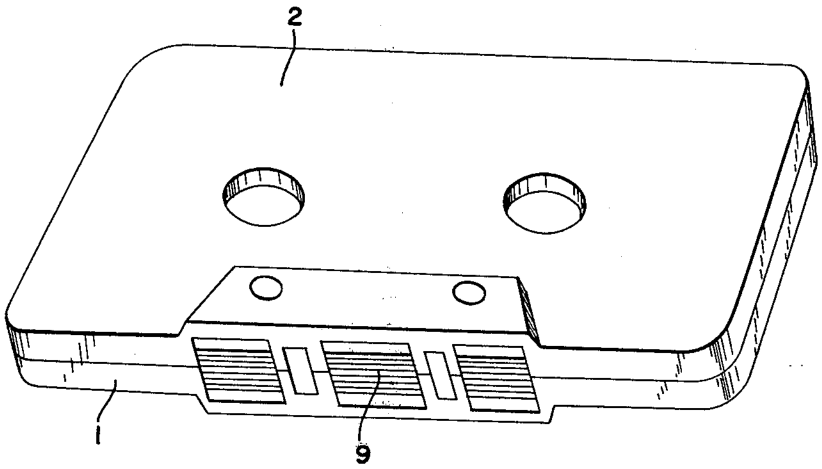
FIG. 1 is a perspective view of a cassette tape and case therefor.

Referring now to the drawings, and more particularly to FIG. 1, it may be seen that the cassette of the present invention, like the conventional cassette, is made up of a lower case 1, an upper case 2 and a tape 9. The characteristic feature of the invention, shown in FIG. 2, comprises a pair of reels 3 and 4, tape portions 9' and 9'' of tape 9 wound on the reels 3 and 4, respectively, tension arms 5 and 5', and pressure arms 6 and 6' which hold the wound tapes on the reels.

Each of the pressure arms 6 and 6' presses on the external surface of its respective tape 9' and 9'' with its free end. Each of the tension arms 5 and 5' also contacts a surface of the tape with its respective free end 7 or 7'. The other ends of the pressure arms 6 and 6' are connected to the other ends of the tension arms 5 and 5' through spring rings 8 and 8', respectively, which are made of phosphor bronze, steel or synthetic resin, or the like, which are held on respective poles 14 and 14' mounted in the lower case 1.

The other parts of the cassette tape of the invention are the same as those of conventional cassette tapes and accordingly further description of the structure can be omitted in the illustration.

Figure 2:
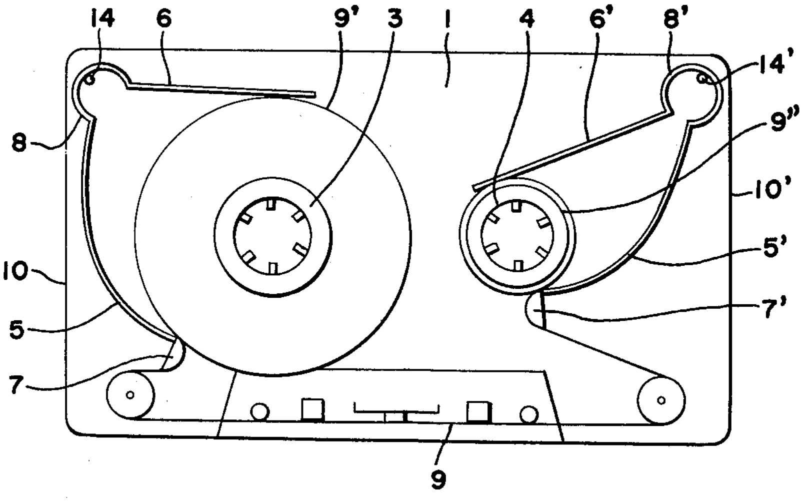
FIG. 2 is a plan view of one embodiment of a cassette tape according to this invention, wherein the one half of the case has been removed to show the interior thereof.
Figure 3:
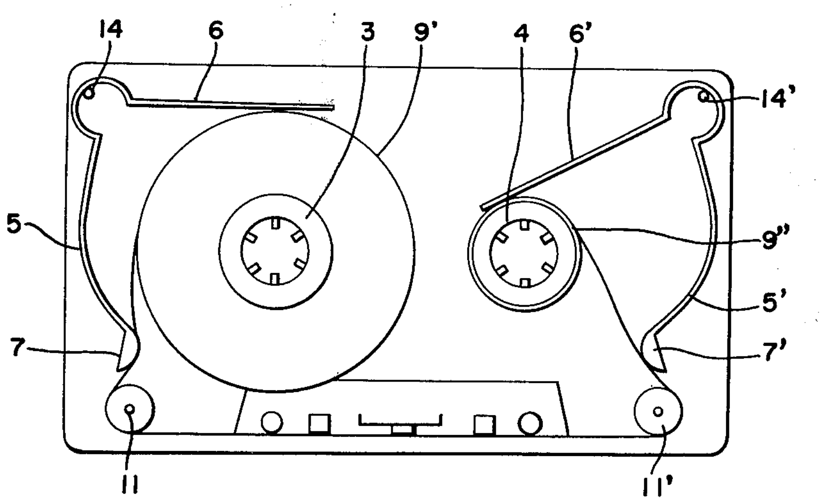
FIG. 3 is a plan view of the cassette tape of FIG. 2, showing the operation thereof when the cassette case has been positioned for use in a cassette player.

When a cassette tape having the characteristic features shown in the embodiment illustrated in FIG. 2 is fitted in a tape player and the tape player is operated, the structure is changed, as shown in FIG. 3, by imparting a tension to the running tape through the free ends of the tension arms 5 and 5'. Each of the tension arms 5 and 5' is connected to its respective one of the pressure arms 6 and 6' by its spring, and accordingly, each of the pressure arms 6 and 6' imparts suitable pressure to each of the wound tape portions 9' and 9'' by operation of the respective tension arms 5 and 5'. The pressure applied increases depending upon the diameter of the wound tape, such as, for example, in FIG. 3, higher pressure is imparted by the pressure arm 6 than by the pressure arm 6'. Guide rollers 11 and 11' are held in the case so as to hold and guide the tape between the two reels 3 and 4.

Figure 4:
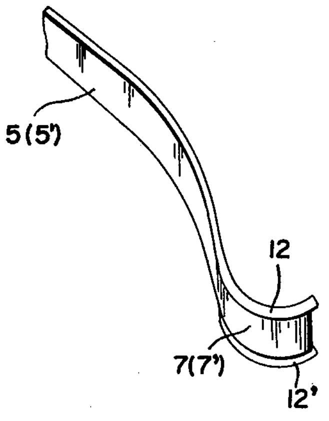
FIG. 4 is a perspective view of one embodiment of a tension arm forming part of the cassette shown in FIGS. 2 and 3.

As shown in FIG. 4, the free ends 7 and 7' of the tension arms 5 and 5' can have parallel flanges 12 and 12' for disposition around the part thereof contacting the magnetic surface of the tape 9 and thereby serving to guide the tape more effectively while providing the tension desired. The width of the flanges is slightly larger than the width of the tape, and as the ends 7 and 7' of the tension arms contacting the magnetic surface of the tape require high slidability or smoothness, they, as well as the pressure arms, can be formed by using plastic having smooth surfaces.

Figure 5:
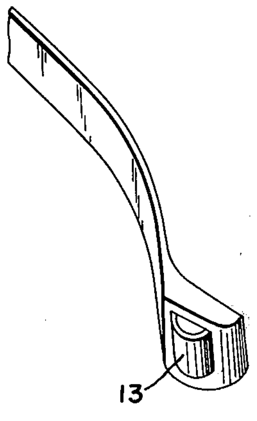
FIG. 5 is a perspective view of another embodiment of a tension arm.

As shown in FIG. 5, it is even more effective to provide a rotatable part for contacting the tape, such as a roller 13.

Thus, in the cassette tape of the present invention, the tension arms are provided for improving the characteristics of the running of the tape, and the pressure arms impart higher pressure depending upon an increase in the diameter of the wound tape so as to effectively prevent run off of the tape.

Obviously, many modifications and variations of the present invention are possible in light of these teachings. It is therefore to be understood that within the scope of the appended claims, the invention may be practiced otherwise than as specifically described herein.

What is claimed as new and intended to be covered by Letters Patent is:

1. A cassette tape having windup control means comprising:

a pressure arm for pressing an external surface of a tape being wound upon a reel with a free end of the arm;

a tension arm for contacting a free-floating portion of said tape with a free end of said tension arm; and spring means connecting the other end of said pressure arm with the other end of said tension arm.

2. A cassette tape comprising:

a case;

a feeding reel in said case for a tape;

a first pressure arm for pressing an external surface of a tape being fed from said feeding reel with a free end of the first pressure arm;

a first tension arm in said case for contacting a free-floating portion of said tape being fed from said feeding reel with a free end of said first tension arm;

a first spring connecting the other end of said first pressure arm with the other end of said first tension arm;

a receiving reel for having a tape wound thereon from said feeding reel;

a second pressure arm pressing an external surface of the tape being wound upon said receiving reel with a free end of said second pressure arm;

a second tension arm for contacting a free-floating portion of the tape being wound upon said receiving reel with a free end of said second tension arm; and a second spring connecting the other end of said second pressure arm with the other end of said second tension arm.

3. A cassette tape according to claim 2, wherein the free end of at least one of the tension arms has a flanged surface for holding and guiding the tape contacted thereby.

4. A cassette tape according to claim 2, wherein the free end of at least one of the tension arms has a smooth surface.

5. A cassette tape according to claim 2, wherein the free end of at least one of the tension arms has a roller thereon for contacting the tape.

6. A cassette tape according to claim 2, wherein said first and second springs are spring rings from which the first and second tension arms and pressure arms are extended.

7. A cassette tape according to claim 2, wherein the pressure of the pressure arm increases according to an increase of the diameter of the wound tape.

8. A cassette tape according to claim 2, wherein said first and second springs connecting said first and second pressure arms and tension arms are pivoted to respective poles mounted in said case so as to permit rotation and sliding movement.

* * * * *